United States Patent Office 3,519,620
Patented July 7, 1970

3,519,620
2-VINYL-1,4-DIHYDROQUINAZOLINE
DERIVATIVES
Joachim Augstein, William C. Austin, Alastair M. Monro, and Derek H. Morgan, Kent, England, assignors to Chas. Pfizer & Co., Inc., New York, N.Y., a corporation of Delaware
No Drawing. Filed Mar. 3, 1967, Ser. No. 620,248
Claims priority, application Great Britain, Mar. 10, 1966, 10,503/66
Int. Cl. C07d 51/48
U.S. Cl. 260—240
5 Claims

ABSTRACT OF THE DISCLOSURE

Certain novel 2-vinyl-1,4-dihydroquinazoline compounds useful as anti-hypertensive agents are prepared by the novel process of reacting an appropriately substituted 2-methyl-1,4-dihydroquinazoline with at least an equimolar amount of a desired aldehyde in an inert solvent at a temperature of from about 30° C. to about 200° C. for a period of up to 48 hours in the presence of a catalytic amount of a weak base.

BACKGROUND OF THE INVENTION

This invention relates to novel organic compounds having therapeutic properties and to a novel method of preparing many of such compounds. More particularly, it relates to certain 2-vinyl-1,4-dihydroquinazoline derivatives useful as effective anti-hypertensive agents and to a simple one-step condensation reaction for making many of these novel compounds.

SUMMARY OF THE INVENTION

Accordingly, the present invention discloses compounds having the formula:

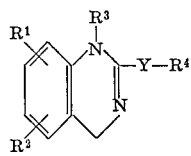

wherein $R^1$ and $R^2$ are each selected from the group consisting of hydrogen, halogen (F, Cl, Br, I), alkyl and alkyloxy, said alkyl groups containing from 1 to 4 carbon atoms, $R^3$ is selected from the group consisting of benzyl and alkyl containing up to 4 carbon atoms; $R^4$ is selected from the group consisting of those of the formulae:

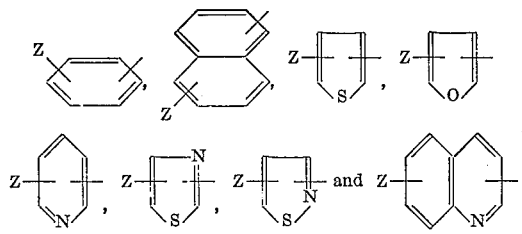

wherein Z is selected from the group consisting of hydrogen, phenyl, halogen (F, Cl, Br, I), hydroxy, nitro, amino, mono- and di-alkyl amino, alkyl and alkyloxy, said alkyl groups containing from 1 to 4 carbon atoms; and Y is selected from the group consisting of

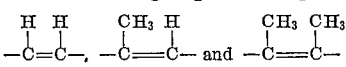

and the pharmaceutically acceptable acid addition salts thereof.

A particularly preferred embodiment of the herein described invention concerns those compounds represented by the above formula when Y is unsubstituted vinylene. Such compounds can be prepared by a novel process which entails reacting a 2-methyl-1,4-dihydroquinazoline of the formula:

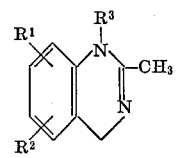

wherein $R^1$, $R^2$ and $R^3$ are as defined above with at least an equimolar amount of an aldehyde having the formula

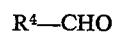

$R^4$—CHO wherein $R^4$ is as shown above in an inert solvent at a temperature of from about 30° C. to about 200° C. for a period of from about 1 hour to about 48 hours in the presence of a catalytic amount of a weak base and subsequently recovering the resulting product.

DETAILED DESCRIPTION OF THE INVENTION

The starting materials, that is, 2-methyl-1,4-dihydroquinazolines and aldehydes necessary for the novel synthetic process disclosed herein are either commercially available or easily prepared by well-known standard organic techniques. The reaction is carried out in an inert solvent. An inert solvent for purposes of this invention contemplates any solvent which allows solubilization and is non-reactive toward either the reagents or products. Hydrocarbon solvents are preferred such as toluene, benzene or xylene; however, any solvent possessing the qualities set forth above will be satisfactory. The temperature at which the reaction is performed may vary from about 30° C. to about 200° C. and for the most part will depend on the boiling point of the solvent used since reflux temperatures are most appropriate. By using a solvent such as toluene at refluxing temperatures with a Dean & Stark trap attached to remove the water of reaction which forms, one can conveniently measure the completion of reaction. That is to say, if the theoretical amount of water is collected with no more being formed, the reaction is virtually over and the recovery step may commence on cooling. This latter innovation will in turn necessarily dictate the time period in carrying out the reaction. It may vary of course, but in most cases will require more than about 1 hour and no longer than about 48 hours. Since the reaction is a base condensation step, a weak base in catalytic amounts in a necessary component. Such a base causes the removal of a proton from the methyl group allowing the resulting anionic moiety to attack the electron-poor carbon of the carbonyl function on the aldehyde molecule. The unstable intermediate loses a molecule of water giving the desired 2-vinyl product. A weak base such as piperidine has been found to be very effective, however, any secondary organic amine like morpholine or pyrrolidine should be equally effective.

The product of this reaction is the free base having the formula:

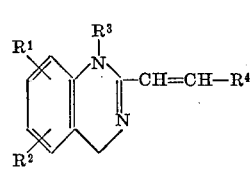

wherein $R^1$, $R^2$, $R^3$ and $R^4$ are as previously defined, which may be isolated by removing the solvent and catalyst under reduced pressure and then converted to a pharmaceutically-acceptable acid addition salt by dissolving in a suitable solvent and adding the requisite amount of acid to precipitate the salt.

The compounds prepared by this method have been identified as having the trans isomeric structure of the vinylene group. This identification is established by means of infra-red, ultra-violet and nuclear magnetic resonance spectroscopy.

The acids which are used to prepare the pharmaceutically-acceptable acid addition salts of the invention are those which form non-toxic addition salts containing pharmaceutically-acceptable anions, such as the hydrochloride, hydrobromide, hydroiodide, sulphate or bisulphate, phosphate or acid phosphate, acetate, lactate, citrate, tartrate, gluconate, saccharate, maleate, fumarate, pamoate (embonate) and p-toluenesulphonate salts.

As is evident by the description of the above novel process, it is suitable only for the preparation of derivatives in which substituent Y is an unsubstituted vinylene group. It is however possible to have mono-and di-substituted methyl vinylene groups and such are within the scope of this invention.

The procedure found to be applicable for preparing compounds designated by the general structural Formula I wherein Y is either

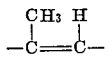

or

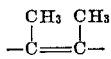

comprises the following: N-substituted o-aminobenzyl halides which are commercially available or easily synthesized of the formula:

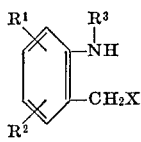

wherein $R^1$, $R^2$ and $R^3$ are as previously defined, and X represents a halogen atom are reacted with a stoichiometric equivalent amount of a nitrile of the formula $R^4$—Y—CN, where $R^4$ and Y are as defined above, in the presence of a Friedel-Crafts type of catalyst, for example, stannic chloride. The reaction may, if desired, be carried out in a suitable solvent, for instance, nitrobenzene at temperatures of from 20° C. to about 200° C. for periods of from 1 hour to 24 hours. When the reaction is complete, the solvent, if present, may be removed by methods known in the art, for example, by steam distillation and the desired compound isolated from the residue by basifying to liberate the free base and extracting into a suitable solvent such as methylene chloride, followed by distillation to give the product as the free base, or by the addition of a suitable acid to give a pharmaceutically-acceptable acid addition salt.

It is obvious that the procedure just described is applicable as well for the preparation of compounds wherein Y is unsubstituted vinylene. Hence, an alternative procedure, although less preferred, is available for the preparation of certain of the highly useful compounds of this invention.

The anti-hypertensive activity of the compounds disclosed herein is verified by in-vivo determination. One such determination comprises the subcutaneous administration of the subject compounds to conscious hypertensive rats. Another test consists of orally administering to hypertensive rats the disclosed novel compounds. Still another indicative test comprises the intravenous administration of these compounds to conscious hypertensive dogs. In each instance, a lowering in hypertension resulted.

The compounds of the invention can be administered alone, but will generally be administered in admixture with a pharmaceutical carrier selected with regard to the intended route of administration and standard pharmaceutical practice. For example, they may be administered orally in the form of tablets containing such excipients as starch, lactose and various types of clay, or in capsules either alone or in admixture with excipients, or in the form of elixirs or suspensions containing flavoring or coloring agents. They may be injected parenterally, for example, intramuscularly or subcutaneously. For parenteral administration, they are best use din the form of a sterile aqueous solution which may contain other solutes, for example, enough salts or glucose to make the solution isotonic.

The following examples are given to more fully illustrate the present invention. It is to be understood that these examples are for illustrative purposes only and that the invention is not meant to be limited to the specific details of the examples.

Example I.—Trans 1-methyl-2-[2d-(2'-thienyl)vinyl]-1,4-dihydroquinazoline

A mixture containing 1,2-dimethyl-1,4-dihydroquinazoline (5.5 g.), thiophene-2-aldehyde (3.9 g.), piperidine (0.3 ml.) and dry toluene (60 ml.) is stirred and heated under reflux (about 3–4 hours) in a Dean & Stark apparatus until the theoretical amount of water of reaction is collected. The solvent and piperidine are then removed under reduced pressure, and the residue converted to its fumarate salt by dissolving the residue in methanol and adding an equivalent amount of fumaric acid dissolved in methanol. Trans 1-methyl-2-[2-(2'-thienyl)vinyl]-1,4-dihydroquinazoline hydrogen fumarate is obtained, M.P. 189–191° C. after crystallization from ethanol.

Analysis.—Calculated for $C_{19}H_{18}N_2O_4S$ (percent): C, 61.60; H, 4.90; N, 7.57; S, 8.65. Found (percent): C, 61.78; H, 5.18; N, 7.53; S, 8.50.

Nuclear magnetic resonance evidence indicated that the double bond in the vinylene group was in the trans rather than the cis configuration.

Example II.—Trans 1-methyl-2-[2-(3'-pyridyl)vinyl]-1,4-dihydroquinazoline

The procedure of Example I is repeated to prepare trans 1 - methyl-2-[2-(3'-pyridyl)vinyl]-1,4-dihydroquinazoline using the following reagents:

1,2-dimethyl-1,4-dihydroquinazoline (8.0 g.)
pyridine-3-aldehyde (5.35 g.)
piperidine (0.5 ml.)
toluene (100 ml.)

The residue is dissolved in ethyl acetate and converted to its maleate salt by adding an equivalent amount of maleic acid dissolved in ethyl acetate. The hydrogen maleate salt is recrystallized from isopropanol as fine yellow needles, M.P. 170.5–172° C.

Analysis.—Calculated for $C_{20}H_{19}N_3O_4$ (percent): C, 65.73; H, 5.24; N, 11.5. Found (percent): C, 65.51; H, 5.15; N, 11.38.

Example III.—Trans 1-methyl-2-styryl-1,4-dihydroquinazoline

The preparation of the subject compound is accomplished utilizing the procedure outlined in Example I except that a stoichiometric equivalent amount of benzaldehyde is used in lieu of thiophene-2-aldehyde with comparable results.

The crude product is converted to its maleate salt by dissolving the residue in ethanol and adding an equivalent amount of maleic acid in ethanol. The hydrogen maleate salt is recrystallized from an ethanol-water mixture, M.P. 154–155° C.

Analysis.—Calculated for (percent): C, 69.21; H, 5.53; N, 7.69. Found (percent): C, 69.25; H, 5.25; N, 7.89.

Example IV

The procedure of Example I is repeated for the preparation of the products listed below wherein stoichiometric equivalent amounts of the appropriate aldehydes shown are used in place of thiophene-2-aldehyde and good results are obtained in each instance. The products are isolated as the acid addition salts shown with their respective melting points and analyses:

| Aldehyde | Acid | Salt recrystallized from— |
|---|---|---|
| A....... 5-methyl-2-thiophene aldehyde. | Fumaric........... | Water. |
| B....... 3-methyl-2-thiophene aldehyde. | ......do............ | Do. |
| C.............do................ | Hydroiodic......... | Isopropanol. |
| D....... Furfuraldehyde..... | Maleic............. | Isopropanol+ether. |
| E....... Benzaldehyde........ | Hydrochloric...... | Water. |
| F....... 1-naphthaldehyde... | Maleic............. | Ethanol. |
| G.............do................ | Hydrochloric...... | Isopropanol+60/80° petro-ether. |
| H....... p-Methyl benzaldehyde. | ......do............ | Water. |
| I....... o-Methyl benzaldehyde. | ......do............ | Do. |
| J....... p-Chloro benzaldehyde. | ......do............ | Do. |
| K....... o-Methoxy benzaldehyde. | ......do............ | Isopropanol. |
| L....... Anisaldehyde........ | Maleic............. | Isopropanol+water. |
| M....... Pyridine-2-aldehyde. | Hydroiodic......... | Methanol. |
| N....... Pyridine-4-aldehyde. | Maleic............. | Methanol+ethyl-acetate. |
| O....... p-Nitrobenzaldehyde. | Fumaric........... | Isopropanol. |
| P....... 3, 4-difluorobenzaldehyde. | Maleic............. | Methanol+ethyl-acetate. |
| Q....... 2-naphthaldehyde... | Fumaric........... | Isopropanol. |
| R....... p-Phenylbenzaldehyde. | Hydrochloric...... | Do. |

Product: M.P., °C.
(A) 1 - methyl - 2 - [2-(5'-methyl-2'-thienyl)-vinyl] - 1,4-dihydroquinazoline hydrogen fumarate.H$_2$O _____ 205–207
(B) 1 - methyl-2-[2 - (3'-methyl-2'-thienyl)-vinyl]-1,4-dihydroquinazoline hydrogen fumarate _____ 208–209
(C) 1 - methyl - 2 - [2-(3'-methyl-2'-thienyl)-vinyl] - 1,4 - dihydroquinazoline hydroiodide _____ 251–253
(D) 1 - methyl - 2 - [2-(2'-furyl)vinyl]-1,4-dihydroquinazoline hydrogen maleate _____ 153.5–154
(E) 1 - methyl - 2 - styryl-1,4-dihydroquinazoline hydrochloride.H$_2$O _____dec.. 229–234
(F) 1 - methyl - 2 - [2 - (1' - naphthyl)vinyl]-1,4 - dihydroquinazoline hydrogen maleate _____dec.. 188–191
(G) 1 - methyl - 2 - [2 - (1'-naphthyl)vinyl]-1,4-dihydroquinazoline hydrochloride _____ 235–236
(H) 1 - methyl - 2 - p - methyl-styryl-1,4-dihydroquinazoline hydrochloride.1¼H$_2$O ___ 185–188
(I) 1 - methyl - 2 - o - methyl-styryl-1,4-dihydroquinazoline hydrochloride.1¾H$_2$O ___ 218–222
(J) 1 - methyl - 2 - p - chloro-styryl-1,4-dihydroquinazoline hydrochloride.H$_2$O _____ 230–233
(K) 1 - methyl - 2 - o - methoxy-styryl-1,4-dihydroquinazoline hydrochloride _____ 240–242
(L) 1 - methyl - 2 - p-methoxy-styryl-1,4-dihydroquinazoline hydrogen maleate _____ 166–170
(M) 1 - methyl - 2 - [2-(2'-pyridyl)vinyl]-1,4-dihydroquinazoline hydroiodide _____ 218–219
(N) 1 - methyl - 2 - [2-(4'-pyridyl)vinyl]-1,4-dihydroquinazoline sesqui-hydrogen maleate.0.875H$_2$O _____ 124–125
(O) 1 - methyl - 2 - p-nitrostyryl-1,4-dihydroquinazoline hydrogen fumarate _____ 226–228
(P) 1 - methyl - 2 - [3',4'-difluorostyryl]-1,4-dihydroquinazoline hydrogen maleate _____ 182–183
(Q) 1 - methyl - 2-[2-(2'-naphthyl)vinyl]-1,4-dihydroquinazoline hydrogen fumarate ___ 219–220
(R) 1 - methyl - 2 - p - phenylstyryl-1,4-dihydroquinazoline hydrochloride _____ 270–272

Analysis (theoretical in brackets)

| | C | H | N | Others |
|---|---|---|---|---|
| A | 59.43 (59.69) | 5.27 (5.51) | 6.50 (6.96) | S:8.14 (7.91) |
| B | 62.04 (62.48) | 5.09 (5.24) | 7.53 (7.29) | |
| C | 48.5 (48.5) | 4.25 (4.33) | 7.30 (7.07) | I:32.0 (32.0) |
| D | 64.22 (64.40) | 5.27 (5.12) | 7.68 (7.91) | |
| E | 67.21 (67.43) | 5.93 (6.32) | 8.90 (9.25) | |
| F | 72.42 (72.45) | 5.39 (5.35) | 6.78 (6.76) | |
| G | 75.01 (75.30) | 5.75 (5.72) | 8.32 (8.37) | |
| H | 67.50 (67.30) | 5.87 (6.75) | 8.11 (8.73) | Cl:10.67 (11.03) |
| I | 65.02 (65.40) | 6.51 (6.86) | 7.94 (8.47) | Cl:10.60 (10.74) |
| J | 60.38 (60.54) | 5.23 (5.38) | 8.30 (8.31) | Cl:21.68 (21.03) |
| K | 68.73 (60.70) | 6.10 (6.08) | 8.44 (8.90) | Cl:10.99 (11.27) |
| L | 66.55 (66.99) | 5.64 (5.62) | 6.70 (7.10) | |
| M | 51.31 (50.95) | 4.34 (4.28) | 10.73 (11.14) | |
| N | 60.77 (60.16) | 5.29 (5.22) | 9.54 (9.57) | |
| O* | 62.96 (61.52) | 5.31 (4.67) | 9.28 (10.26) | |
| P | 62.82 (62.98) | 4.46 (4.53) | 6.82 (7.00) | |
| Q | 72.53 (72.4) | 5.38 (5.3) | 6.6 (6.7) | |
| R | 76.24 (76.58) | 6.07 (5.87) | 7.32 (7.76) | |

*Contains 2% (by wt.) iso-propanol.

Example V

The procedure of Example I is repeated wherein the following 2-methyl-1,4-dihydroquinazolines and aldehydes, in stoichiometric equivalent amounts, are used in place of 1,2-dimethyl-1,4-dihydroquinazoline and thiophene-2-aldehyde, respectively, to give the indicated products in good yields:

| Quinazoline derivative | Aldehyde | Product |
|---|---|---|
| 1-benzyl-2,6-dimethyl-1,4-dihydroquinazoline. | p-Bromo benzaldehyde. | 1-benzyl-2-p-bromo-sytryl-6-methyl-1,4-dihydroquinazoline. |
| 1,5-dibutyl-2-methyl-1,4-dihydroquinazoline. | 6-fluoro-2-napthaldehyde. | 1-butyl-2-[2-(6'-fluoro-2'-naphthyl)vinyl]-5-butyl-1,4-dihydroquinazoline. |
| 1-propyl-2-methyl-5,6-dichloro-1,4-dihydroquinazoline. | 4-iodo-thiophene-2-aldehyde. | 1-propyl-2-[2-(4'-iodo-2'-thienyl)vinyl]-5,6-dichloro-1,4-dihydroquinazoline. |
| 1-ethyl-2-methyl-7-iodo-1,4-dihydroquinazoline. | 4-chloro-furan-2-aldehyde. | 1-ethyl-2-[2-(4'-chloro-2'-furyl)vinyl]-7-iodo-1,4-dihydroquinazoline. |
| 1-ethyl-2-methyl-8-bromo-1,4-dihydroquinazoline. | 4-butyl-pyridine-2-aldehyde. | 1-ethyl-2-[2-(4'-butyl-2'-pydridyl)vinyl]-8-bromo-1,4-dihydroquinazoline. |
| 1,2-dimethyl-6,7-dimethoxy-1,4-dihydroquinazoline. | 4-ethyl-thiazole-2-aldehyde. | 1-methyl-2-[2-(4'-ethyl-2'-thiazolyl)vinly]-6,7-dimethoxy-1,4-dihydroquinazoline. |
| 1-benzyl-2-methyl-5-butoxy-1,4-dihydroquinazoline. | 3-methyl-isothiazole-5-aldehyde. | 1-benzel-2-[2-(3'-methyl-5'-isothiazolyl)vinyl]-5-butoxy-1,4-dihydroquinazoline. |
| 1-butyl-2-methyl-5,8-diethyl-1,4-dihydroquinazoline. | o-Methoxy benzaldehyde. | 1-butyl-2-o-methoxy-styryl-5,8-diethyl-1,4-dihydroquinazoline. |
| 1-propyl-2-methyl-6-fluoro-1,4-dihydroquinazoline. | m-Butoxy benzaldehyde. | 1-propyl-2-m-butoxy-styryl-6-fluoro-1,4-dihydroquinzaoline. |
| Do. | o-Hydroxy benzaldehyde. | 1-propyl-2-o-hydroxy-styryl-6-fluoro-1,4-dihydroquinazoline. |
| 1,5-dibutyl-2-methyl-1,4-dihydroquinazoline. | Quinoline-2-aldehyde. | 1-butyl-2-[2-(2'-quinolyl)vinyl]-5-butyl-1,4-dihydroquinazoline. |
| Do. | 4-amino-quinoline-2-aldehyde. | 1-butyl-2-[2-(4'-amino-2'-quinolyl)vinyl]-5-butyl-1,4-dihydroquinazoline. |
| Do. | 4-methylamino-quinoline-2-aldehyde. | 1-butyl-2-[2-(4'-methyl-amino-2'-quinolyl)vinyl]-5-butyl-1,4-dihydroquinazoline. |
| Do. | 4-dimethylamino-quinoline-2-aldehyde. | 1-butyl-2-[2-(4'dimethyl-amino-2'-quinolyl)-vinyl]-5-butyl-1,4-dihydroquinazoline. |
| 1-ethyl-2-methyl-5,6-dipropyl-1,4-dihydroquinazoline. | 4-ethoxy-1-napth-aldehyde. | 1-ethyl-2-[2-(4'-ethoxy-1'-napthyl)vinyl]-5,6-diproply-1,4-dihydroquinazoline. |
| 1-benzyl-2-methyl-6-propoxy-1,4-dihydroquinazoline. | 2-chloro-thiophene-3-aldehyde. | 1-benzyl-2-[2-(2'-chloro-3'-thienyl)vinyl]-6-propoxy-1,4-dihydroquinazoline. |
| 1-ethyl-2-methyl-5-bromo-7-ethyl-1,4-dihydroquinazoline. | 2-propoxy-furan-3-aldehyde. | 1-ethyl-2-[2-(2'-propoxy-3'-furyl)vinyl]-5-bromo-7-ethyl-1,4-dihydroquinazoline. |
| 1,2-dimethyl-6-butyl-8-fluoro-1,4-dihydroquinazoline. | 2-propyl-pyridine-3-aldehyde. | 1-methyl-2-[2-(2'-propyl-3'-pyridyl)vinyl]-6-butyl-8-fluoro-1,4-dihydroquinazoline. |
| 1,2-dimethyl-5-ethyl-6-ethoxy-1,4-dihydroquinazoline. | 2-methyl-thiazole-4-aldehyde. | 1-methyl-2-[2-(2'-methyl-4'-thiazolyl)vinyl]-5-ethyl-6-ethoxy-1,4-dihydroquinazoline. |
| 1,2-dimethyl-6-butoxy-8-butyl-1,4-dihydroquinazoline. | 4-methoxy-isothiazole-5-aldehyde. | 1-methyl-2-[2-(4'-methoxy-5'-isothiazolyl)vinyl]-6-butoxy-8-butyl-1,4-dihydroquinazoline. |

Example VI.—1-methyl-2-styryl-1,4-dihydroquinazoline

Cinnamonitrile (0.05 M) in nitrobenzene (100 ml.) is treated with stannic chloride (0.05 M) followed by the addition of o-methylaminobenzyl chloride hydrochloride (0.05 M). The mixture is then stirred at approximately 150° C. for 3 hours and then allowed to cool. The solvent, nitrobenzene, is removed via steam distillation, the residue basified with 5 N aqueous sodium hydroxide and extracted with ether. The dried ether extract is evaporated to give the desired product.

Example VII

The procedure of Example VI is repeated wherein the nitriles shown below are used in stoichiometric equivalent amounts, in lieu of cinnamonitrile to provide the products indicated below in good yields.

| Nitrile: | Product |
| --- | --- |
| α-Methyl cinnamonitrile | 1 - methyl - 2 - α-methylstyryl - 1,4-dihydro - quinazoline. |
| β-Methyl cinnamonitrile | 1 - methyl - 2 - β-methylstyryl - 1,4 - dihydroquinazoline. |
| α,β-Dimethyl cinnamonitrile | 1 - methyl - 2 - α,β - dimethylstyryl-1,4 - dihydroquinazoline. |

What is claimed is:
1. A compound of the formula:

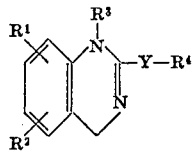

wherein $R^1$ and $R^2$ are each selected from the group consisting of hydrogen, halogen (F, Cl, Br, I), alkyl and alkyloxy, said alkyl groups containing from 1 to 4 carbon atoms; $R^3$ is selected from the group consisting of benzyl and alkyl containing up to 4 carbon atoms; $R^4$ is selected from the group consisting of those of the formulae:

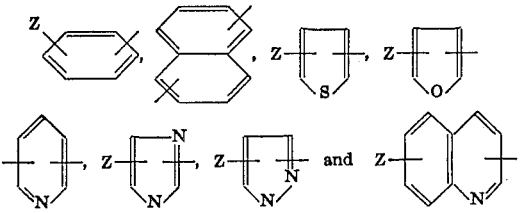

wherein Z is selected from the group consisting of hydrogen phenyl, halogen (F, Cl, Br, I), hydroxy, nitro, amino, mono-and di-alkyl amino, alkyl and alkyloxy, said alkyl groups containing from 1 to 4 carbon atoms; and Y is selected from the group consisting of

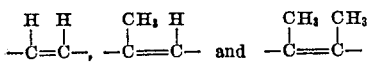

and the pharmaceutically acceptable acid addition salts thereof.

2. A compound as claimed in claim 1 wherein $R^1$ and $R^2$ are each hydrogen, $R^3$ is methyl and Y is vinylene having a trans configuration.

3. A compound as claimed in claim 2 wherein $R^4$ is 2-thienyl.

4. A compound as claimed in claim 2 wherein $R^4$ is 3-pyridyl.

5. A compound as claimed in claim 2 wherein $R^4$ is phenyl.

References Cited

FOREIGN PATENTS 2,581M  6/1964  France.

OTHER REFERENCES

Ried et al.: Annalen der Chemie, vol. 600, pp. 55 to 56 (1956).

Chemical Abstracts, vol. 63, col. 13256 (1965).

JOHN D. RANDOLPH, Primary Examiner

U.S. Cl. X.R.

260—251, 332, 332.5, 329, 306.8, 302, 288, 289, 296, 297, 347.7, 347.8, 599, 999, 600.